US009779114B2

(12) United States Patent
Rogers

(10) Patent No.: US 9,779,114 B2
(45) Date of Patent: Oct. 3, 2017

(54) MEDIA GEOTAGGING

(71) Applicant: Henk B. Rogers, Honolulu, HI (US)

(72) Inventor: Henk B. Rogers, Honolulu, HI (US)

( * ) Notice: Subject to any disclaimer, the term of this patent is extended or adjusted under 35 U.S.C. 154(b) by 0 days.

(21) Appl. No.: 15/360,452

(22) Filed: Nov. 23, 2016

(65) Prior Publication Data

US 2017/0075924 A1   Mar. 16, 2017

Related U.S. Application Data

(63) Continuation-in-part of application No. 14/115,120, filed as application No. PCT/US2012/059059 on Oct. 5, 2012, now Pat. No. 9,521,175.

(60) Provisional application No. 61/544,384, filed on Oct. 7, 2011.

(51) Int. Cl.
| *G06K 9/00* | (2006.01) |
| *G06F 17/30* | (2006.01) |
| *H04L 29/06* | (2006.01) |
| *H04L 29/08* | (2006.01) |

(52) U.S. Cl.
CPC .... *G06F 17/30241* (2013.01); *G06F 17/3005* (2013.01); *H04L 65/60* (2013.01); *H04L 67/1097* (2013.01)

(58) Field of Classification Search
CPC .......... G06F 17/30241; G06F 17/3005; H04L 65/60; H04L 67/1097
See application file for complete search history.

(56) References Cited

U.S. PATENT DOCUMENTS

| 6,526,158 | B1 | 2/2003 | Goldberg |
| 7,751,543 | B1* | 7/2010 | Langlois ................. H04M 9/00 379/202.01 |
| 7,831,238 | B2 | 11/2010 | Hamberg |
| 8,738,622 | B2* | 5/2014 | Chan ................. G06F 17/30241 707/737 |
| 9,626,103 | B2* | 4/2017 | White ................. G06F 3/04883 |
| 2007/0162942 | A1* | 7/2007 | Hamynen ............. G06T 19/006 725/105 |
| 2008/0132251 | A1 | 6/2008 | Altman et al. |
| 2008/0255837 | A1 | 10/2008 | Kahn et al. |
| 2009/0122198 | A1 | 5/2009 | Thorn |
| 2009/0161994 | A1 | 6/2009 | Sauerwein, Jr. et al. |
| 2010/0169453 | A1 | 7/2010 | Biderman et al. |
| 2010/0179874 | A1 | 7/2010 | Higgins et al. |
| 2010/0235400 | A1 | 9/2010 | Myers et al. |
| 2011/0076995 | A1 | 3/2011 | Kim |
| 2011/0123071 | A1 | 5/2011 | Shah et al. |
| 2011/0153796 | A1 | 6/2011 | Branson |
| 2011/0305374 | A1 | 12/2011 | Chou |
| 2012/0254709 | A1 | 10/2012 | Cok et al. |
| 2012/0275444 | A1 | 11/2012 | Shahsavari |
| 2013/0027571 | A1 | 1/2013 | Parulski |
| 2014/0086458 | A1 | 3/2014 | Rogers |

FOREIGN PATENT DOCUMENTS

| KR | 10-2011-0020158 A | 3/2011 |
| KR | 10-2011-0071790 A | 6/2011 |

* cited by examiner

*Primary Examiner* — Gregory M Desire
(74) *Attorney, Agent, or Firm* — Nixon & Vanderhye P.C.

(57) ABSTRACT

Geotagging techniques allow automatic playback of media items based on position. Tagged items can be presented automatically in response to establishing network communications between two devices.

14 Claims, 16 Drawing Sheets

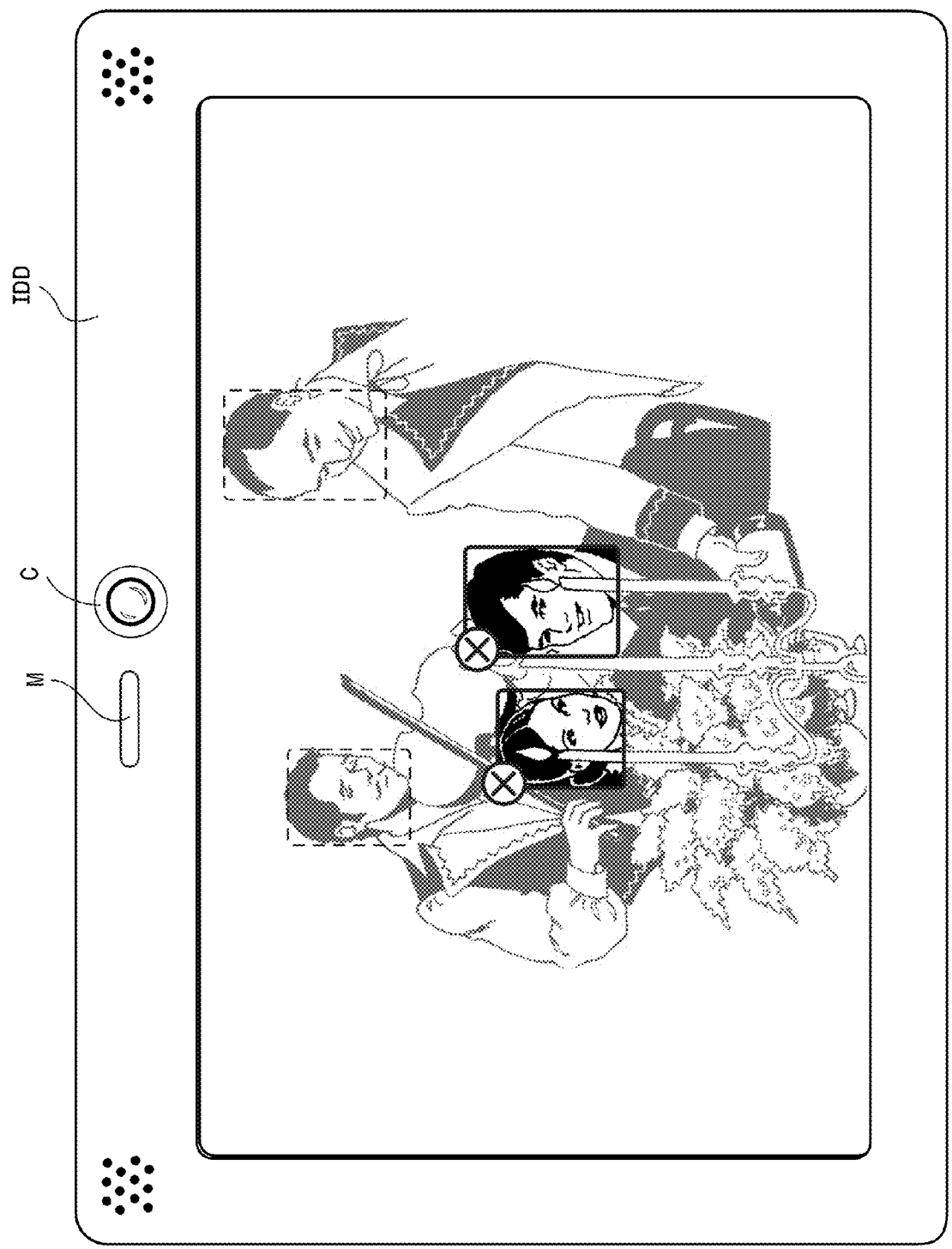

Activate

Select

Record

Recorded

System

Recorder

Player

Stored Geotagged Media

MEDIA GEOTAGGING

CROSS-REFERENCE TO RELATED APPLICATIONS

This application is a continuation-in-part of U.S. patent application Ser. No. 14/115,120 filed Nov. 13, 2013, now U.S. Pat. No. 9,521,175; which is a National phase of International Application No. PCT/US12/59059 filed Oct. 5, 2012; which claims benefit of U.S. Provisional Application No. 61/544,384 filed Oct. 7, 2011; each of which is incorporated herein by reference.

TECHNICAL FIELD

The technology herein relates to tagging of media items, and more particularly to new systems and methods providing innovative tagging user interfaces and use of tagging to link and associate. In more detail, the disclosure herein relates to narrated scenes in which a person viewing the scene describes the scenes as they are being displayed. The recorded comments can be recorded in association with the photos for synchronized playback when the photos are shown again. Such voice comments may be invaluable content in the future and can be stored in a repository. Non-limiting examples provide systems and methods that use tagging technology to tag relevant media items such as photo and video streams based on identity, time and/or event such as location, and to deliver such media items e.g., selectively to people the media items show as associating with one another and/or based on location or identity.

BACKGROUND AND SUMMARY

The digital revolution has radically changed the way we access media. Most digital photo viewing is now done by looking at a screen. Furthermore, it is now possible to store many thousands of photographic, video and other media items on a common mass storage device such as a memory stick, SD card or hard drive and to easily share these items by email, uploading to a website or other electronic techniques. While digital media files can theoretically be assigned distinctive names to identify their respective content, media files are instead often or usually named automatically by the device that created them without regard for content. For example, a digital camera might automatically name a snapshot "IMG_5467.jpg" meaning the 5,467$^{th}$ photo taken by that particular digital camera. Although such automatic sequential or other naming ensures that each media item is assigned a unique name, automatically-generated sequentially assigned numerical file names are not particularly helpful in identifying media item content.

To solve these challenges, many photo sharing websites permit users to electronically "tag" images with identifying information. As one popular sharing site (Flickr) explains, "Tags are like keywords or labels that you add to a photo to make it easier to find later. You can tag a photo with phrases like "Catherine Yosemite hiking mountain trail." Later if you look for pictures of Catherine, you can just click that tag and get all photos that have been tagged that way. You may also have the right to add tags to your friends' photos, if your friends set that option in the privacy settings for their photos."

Unfortunately, manually tagging images in this way can be time-consuming and labor-intensive. Imagine typing in tags for each of the 3000 photos you took on your last vacation. Automatic machine tagging techniques that automatically analyze media items and identify them are known. Some machine-tagging approaches use pattern recognition and pattern matching techniques. For example, automatic face identification algorithms can be used to identify portions of digital photos or videos that contain faces. However, even with machine-tagging approaches, a human is generally asked to identify who the identified face belongs to. Automatic algorithms may then abstract patterns associated with identified elements, and use pattern matching and recognition to automatically identify additional occurrences of the same pattern in other media items within a collection. These techniques, while partially effective, do not completely solve the tagging problem. In particular, a machine can never replace the human factor when it comes to memory, emotion and the human connection.

Additionally, while collaborative tagging (with or without machine assistance) is a useful concept, it can raise privacy concerns. For example, you may not want your friends or acquaintances being able to create captions or tags for cherished photos. Also, it may be entirely appropriate and desirable to share photos taken at a party or other event with others who attended the party or event. However, it may be inappropriate or undesirable to share such photos with people who did not attend the party or other event. Current infrastructure allows some degree of control over who sees what, but the automatic controls tend to be coarse and often ineffective. There exists a compelling need to facilitate sharing of media items with some people or groups while preventing those same media items from being shared with other people or groups.

An easy, interesting and innovative way to manipulate and tag photos while viewing the photos using display devices with processing and sound receiving capability is to apply a voice tag. Voice tagging in the context of real time capture of voice information with a smart phone or other device is generally known. However, further improvements are desirable.

In one example illustration, if a user is looking at a photo on a display device and wishes to tag the photo, the user can touch the photo on the screen and speak a voice tag, or utter a command and then say the voice tag. As one example, if the user is looking at a photo of Gerilynn on the screen and wishes to tag the photo, the user can touch the photo on the touch screen and say "Gerilynn", or alternatively just say "Tag Gerilynn." That photo has now been tagged. The action identifies the people or objects in the photo and also applies a voice tag to the photo.

Thus, in some non-limiting arrangements, touching on the touch screen may not be necessary—voice commands could be used instead (e.g., "tag: Gerilynn") and the voice tagging could automatically be applied to the item displayed at that time. In such implementations, the device could respond to additional voice commands such as "IPAD Gerilynn" by recognizing the word "Gerilynn" and start showing photos that had previously been tagged with "Gerilynn". Any keyword used during the tagging operation(s) could be uttered to call up and cause display of items tagged with that particular keyword.

Any type of device could be commanded in such a manner. For example, one implementation provides a digital photo frame that is hanging on the wall. The digital photo frame includes a microphone. If the user utters the phrase "Photoframe: Antarctica", the digital photo frame could automatically recognize the phrase and begin displaying a single image, a slide show or a stream of images that had previously been tagged with "Antarctica" (e.g., an Antarctica vacation).

Other non-limiting implementations provide additional photoframe functionality. For example, the user could utter the phrase "Photoframe: Free." This can place the photoframe into a free recognition mode where the photoframe begins to attempt to recognize words that are being spoken in the room. If the people in the room just happened to be talking about Antarctica, the photoframe can recognize the word and, when it determines that it has an inventory of photos or other images that were previously tagged with that term, it can begin to display such tagged photos or other images.

In other example implementations, when photos or other images are being displayed, the displaying device can record what people are saying while the photos are being displayed. For example, while a photo stream of a vacation is being displayed, a person viewing the photo stream may describe the photos as they are being displayed. The conversation could for example be comments about important photos such as family history, historical events or the like. The recorded comments can be recorded in association with the photos for synchronized playback when the photos are shown again. Such voice comments may be invaluable content in the future. They could be stored in a repository for example and distributed like videos or podcasts are today. A widely distributed application for a commonly-available device could be used to collect memories and narration of many people and store those memories and narrations in association with the photos or other images in the form of voice tags.

In some implementations, searching for voice tags can be performed in the audio domain by using pattern recognition techniques for example that match uttered audio tags with previously stored audio tags. In other implementations, off-line or on-line processing can be used to recognize uttered speech and store text, data or other information and store this information in association with images for later comparison. In some implementations, it will be possible to recognize who the speakers are in the neighborhood of the device and to play photo streams appropriate to or customized for those particular speakers.

In other implementations, the recorded voice comments can be processed and automatically converted into text for storage and presentation as a written transcript. In other implementations, it may be desirable to store the voice tags separately from the images and simply associate the two on an on-demand basis.

Exemplary illustrative non-limiting technology herein provides innovative tagging technology that makes it fun for users to tag media items such as photos and videos with information relating to people, groups, time, event and other relevant criteria. A user interface provides access to automatic features providing fun and efficient tagging of media items. The items may then be automatically shared based on the tags, e.g., only to members of a particular group, based on age of the media item, or other criteria.

Additionally, an innovative use of tagged media items is to use the tags to automatically communicate or share. For example, media items can be automatically shared or otherwise presented based on tags. For example, particular photo and/or video streams can be tagged as being associated with a particular person, time and event and made available for sharing over a communications network. When that person initiates or establishes a communication over the network, network-connected components can automatically access and retrieve media items tagged to that person, event and/or time and present them to the recipient of the communication.

As one particular example, establishing a voice call or other connection between two parties could cause media items to be accessed based on their tags and automatically presented to call participants. The tagged media items could be transmitted over the voice call connection, or they could otherwise be accessed such as from a video and photo sharing website or other network-based storage. The tagging technology could be based on group sharing techniques. For example, photos taken during a party or other event could be tagged with the event, the people who attended the event and the time of the event. The tagging technology could be used to automatically share recent photos and/or videos based on such tagging so that for example a phone call or text from one of the party participants to another could cause automatic sharing or retrieval for sharing of a photo or video stream associated with that party.

In one exemplary illustrative non-limiting implementation, a communications arrangement provides a network that permits the user devices to communicate. At least one tagging store stores tagged multi-media items, and a tagging server coupled to said network and to said tagging store can automatically access at least one tagged media item for presentation at least in part in response to a communication over said network.

The tagged media item may comprise a video or photo stream presented during communication, said stream being tagged to at least one person, group, time or event.

BRIEF DESCRIPTION OF THE DRAWINGS

These and other features and advantages of exemplary illustrative non-limiting implementations will be better and more completely understood by referring to the following detailed description in conjunction with the drawings, of which:

FIGS. 3-1, 3-2 and 3-3 show three example group scenarios;

DETAILED DESCRIPTION

Figure 1:
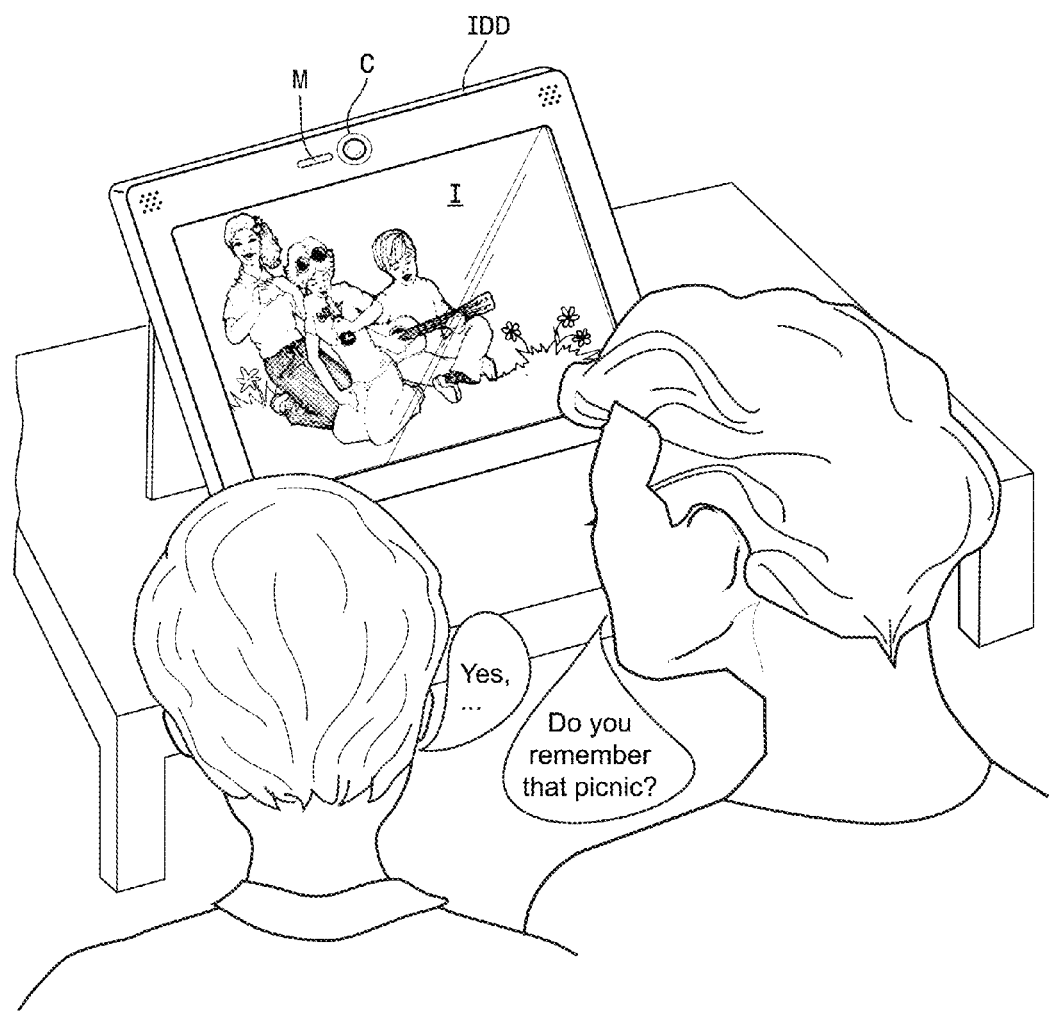
FIG. 1 shows an example image display device.

FIG. 1 shows an example electronic image display device IDD capable of presenting an image. In the example shown, image display device IDD is a tablet computer, iPad, digital photo frame, or any other device capable of electronically presenting images. In the example illustrated in FIG. 1, the image I that image display device IDD displays is a photographic image of an event (e.g., a Fourth of July picnic). The photographic image I could have been created by a digital or film still or motion camera, a smart phone, a computer, an artist, or any other process, device or person that can capture and/or otherwise create an image and fix it into tangible form for storage and display.

Image display device IDD displays image I so people looking at the image display device can visually perceive the image. In the FIG. 1 example, the image display device IDD also includes a camera C and a microphone M. In one example illustration, the camera C and microphone M are used independently and/or together as a presence detector to detect that people are in front of the image display device IDD and looking at the image I currently being displayed. Moreover, in this example illustration, the image display device IDD is capable of acquiring and recording images and sounds of the people who are observing the image I being displayed through use of camera C and microphone M.

The image that image display device IDD displays can be stored locally (e.g., on an insertable nontransitory memory device such as a SD card or flash memory), or it could be stored remotely (e.g., on an image server) and obtained via electronic communications such as over the Internet or other network. The image I could be one of a sequence or stream of images, a single still image, a moving image, etc.

In the example shown, a woman and a boy are viewing the image I that image display device IDD is displaying. The woman on the right recalls the event and begins commenting on it by saying "Do you remember that picnic?" The boy on the left responds "Yes, I do remember the picnic, it was a lot of fun. Remember how it started raining just when we were done eating, and we all huddled together under that shelter, laughing and telling stories until that beautiful rainbow appeared?" In the example shown in FIG. 1, image display device IDD "knows" that people are observing the image I currently being displayed (e.g., by detecting their presence or movement with camera C or microphone M and possibly even recognizing their faces and/or voices), and can record the conversation that may constitute a narration or commentary concerning displayed image I.

In one illustrative non-limiting example, image display device IDD can photograph still or moving images of the people observing the image I as the people talk about the image being displayed. Since many of such devices have cameras, it may be possible to detect people who are looking at photos and to thereby verify that recorded voice has relevance to the photos being shown on the screen. The owner of the photos can then tag the watcher(s) of the photos and connect the voice comments to actual people. When the owner of the photos has cleared voice comments for sharing, icons and "micons" (microphone icons) appear at the side of the photo (see FIG. 5). Touching one of these icons will cause the voice comments to play. Touching the micon will cause all of the voice recordings to be played. Speaking by the watcher of a photo right after a voice comment can be treated as a rebuttal or a continuation of a thread of comments. Whole sequences can be played as synchronous conversation even when it was not.

In one example non-limiting implementation, the image display device IDD can change its behavior based upon detection of presence and/or commentary being provided by the people surrounding the image display device observing the currently displayed image I. As one example, image display device IDD can change from displaying a slide show to dwelling on a particular image I automatically in response to detection of audible commentary concerning the currently-displayed image. Thus, when an iPad or other device goes into a photostream mode either by an automatic screen-saver style timer or by the active booting of an application through an icon press, it starts recording what is being said near the device. In one embodiment, the device is always listening. It continually tries to show photos or present media that people are interested in. If the viewers begin to talk about the media being presented, the stream should stop and the information should be recorded. The device should not jump off the current image until the conversation is done, and it should record the conversation.

In this illustrative example then, image display device IDD does not just display images I but also acquires additional information concerning displayed images including but not limited to oral recollection, reminiscences, commentary, observations, critiques, historical context, stories, songs, or any other information that can be orally expressed by a human being.

Image display device IDD can also acquire visual expression concerning or relating to or inspired by the currently displayed image I such as for example facial expressions of the people who are observing the image, sign language narration or descriptions of the image, pantomimes, play acting, dance, performance, or any other visual expression that a human being is capable of conveying. Image display device IDD may then selectively record and store such acquired audio and/or visual information in association with the image I for later recall and replay by the same or different viewers. Such audible and/or visual information becomes a "tag" that tags or otherwise identifies the image I and describes it for later listening or other access.

Since all iPads and such devices have microphones, we can control IDD without touching them in some example illustrations. All we need is a keyword spoken by the owner of the device to active command mode. Just like in the game "Simon Says", if no "Simon" then no reaction. Some example commands using the phrase "Fotopad" to refer to the IDD are as follows:

| | |
|---|---|
| Fotopad Stop | Stops on present photo |
| Fotopad Pause | Stops on present photo |
| Fotopad Next | Moves to next photo |
| Fotopad Back | Moves to Previous photo |
| Fotopad Play | Continues photostream |
| Fotopad Music | Toggles music on/off |
| Fotopad Event | Moves to next event |

The recorded audible and/or visual information can convey details concerning the image I and may also convey information about the people who are viewing the image. As one example, the illustrative arrangement shown in FIG. 1 could be used to record family history, where grandparents can view and describe old family photographs for posterity. The illustrative arrangement of FIG. 1 could also be used as a personal diary or log book, where photos acquired by a smart phone or other portable device could be narrated by the photographer or other person either at the time of acquisition or at a later viewing time. The FIG. 1 example arrangement can provide advantageous features in any context where it is desirable or helpful to augment an image with additional oral and/or visual information.

Figure 2:
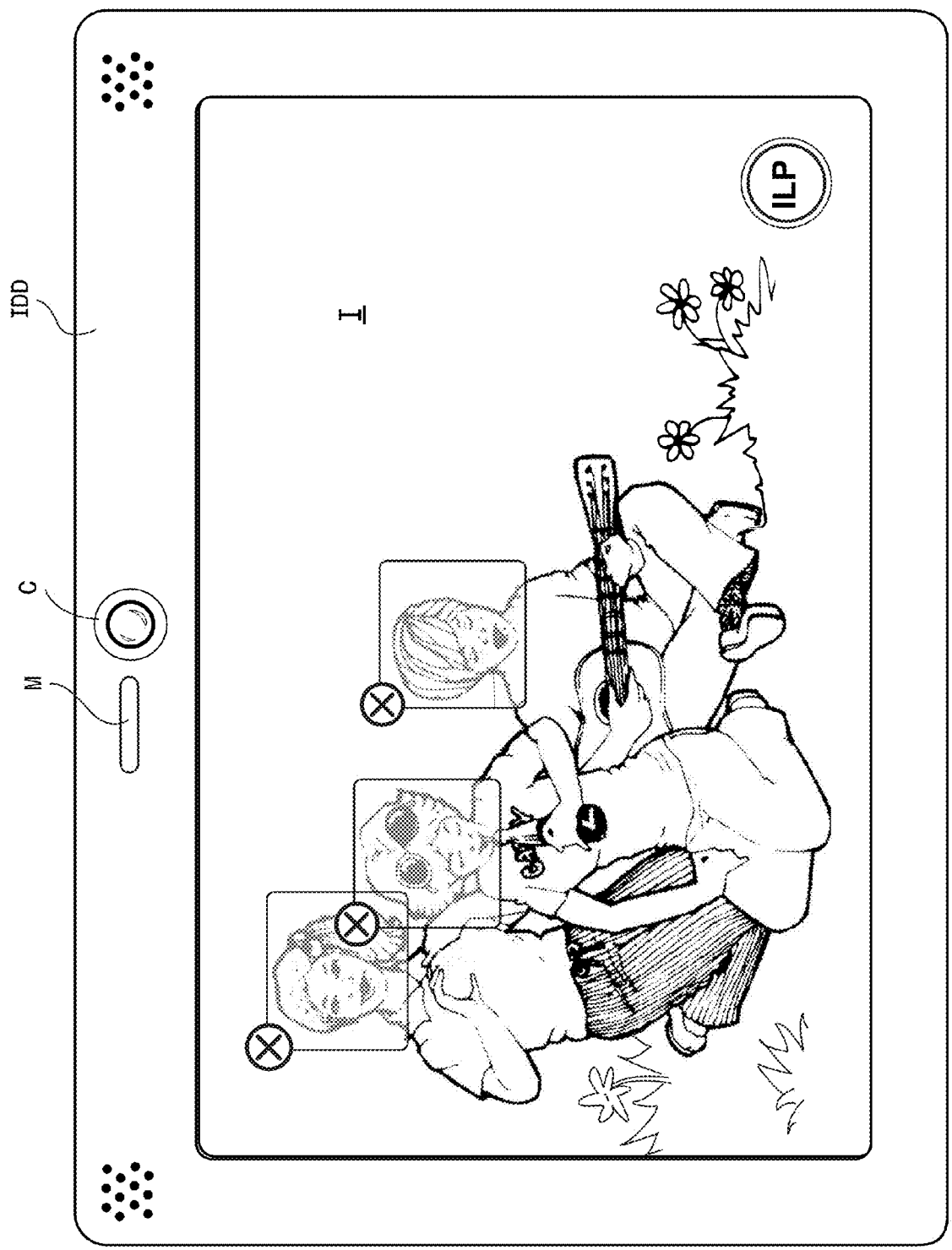
FIG. 2 shows an example image display device user interface.

FIG. 2 shows a further enhancement of the example non-limiting operation of image display device IDD of FIG.

1 providing additional functionality allowing tagging of individual people or objects shown in image I. In the example shown, automated, semi-automated and/or manual techniques may be employed to recognize or otherwise select or delimit different objects (e.g., faces or head shots) and to highlight or otherwise indicate those objects as potential objects for tagging. As shown in FIG. 2, in one non-limiting illustration, software functionality may be employed to recognize the faces of the three subjects within the image I, and those faces may be highlighted or otherwise visually emphasized by for example placing a box or other visual indicator around them, changing the color and/or intensity of the display of the faces and/or the area surrounding the faces, or any other desired visual highlighting or emphasizing technique. The facial tagging function can be activated by depressing a control such as "ILP" to enhance the displayed image I with the additional tagging indications. Thus, image display device IDD can provide two modes, one of which permits display of images I without any interference or enhancement, and a second mode in which additional tagging information can be seen. Depressing the "ILP" control as shown in FIG. 5A may remove (toggle) the image enhancements shown. Alternatively, a dimmer bar as shown in FIG. 5B can be provided to allow selective intensity control of such enhancements.

Figures 1, 3:
FIG. 3 shows selective facial tagging.
Figures 2, 3:
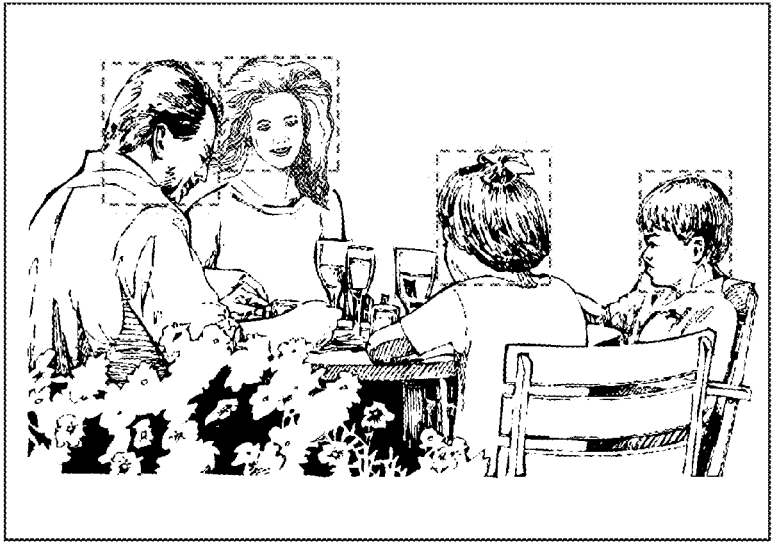
Figure 3:

In the FIG. 2 example shown, each of the three faces in the image I has been highlighted or emphasized by drawing a box around the face. Additionally, an "x" circle in the upper left-hand corner of each displayed box may be used to cancel or delete the software-proposed or other tagging. If the user presses the "x" control, the visual highlighting may disappear and that particular face or other object may be removed from consideration for further tagging or identification. This could be very useful, for example as shown in FIG. 3 where it is not desirable that all of the faces be grouped or tagged (e.g., only the faces of people in the wedding party are tagged, and the faces of the waiter and violinist are not tagged).

Figure 4B:
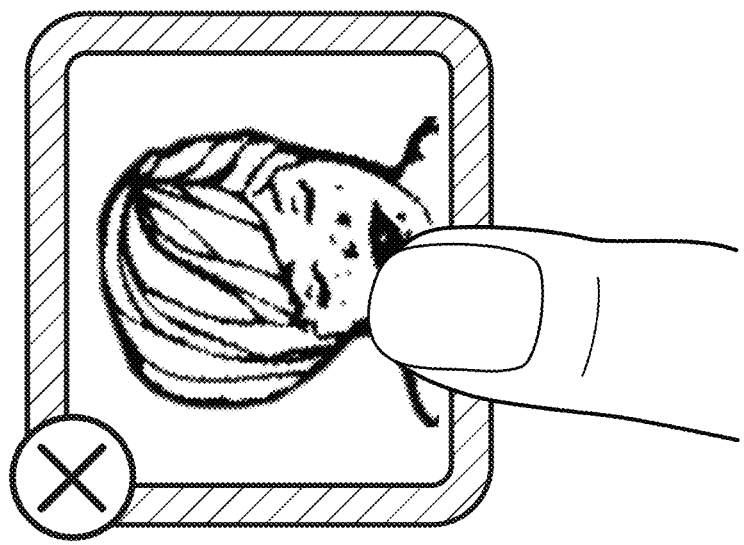
FIGS. 4A-4D show example illustrative audio tag recording user interface features.
Figure 4A:
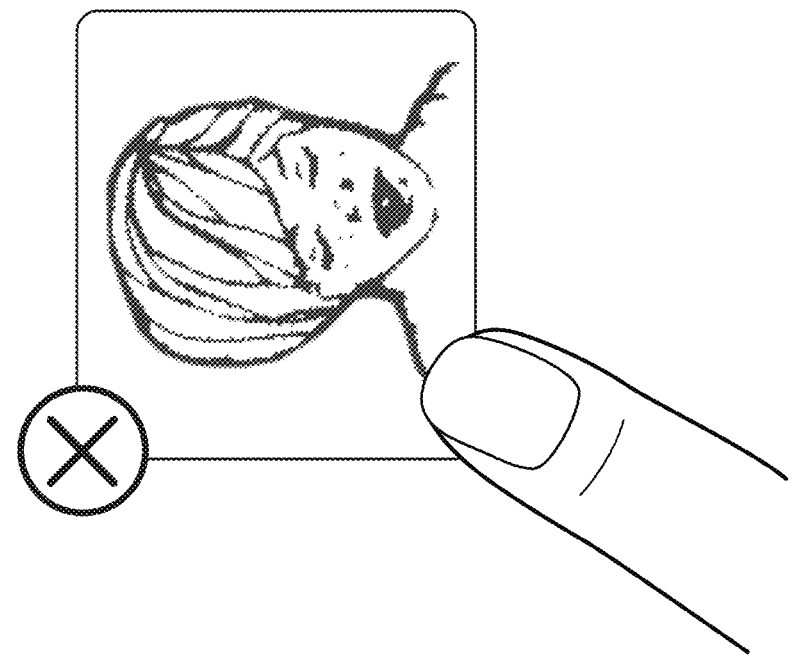

In the non-limiting example illustrative, if the user now wishes to record commentary or recollections concerning one of the subjects tagged in the image I, the user may select that tagged object (e.g., by placing a finger onto a touch screen to touch the already-highlighted area, see FIG. 4A) to thereby activate the tagged object much as an icon displayed on a touch screen-based smart phone or other device may be activated (see FIG. 4B). Thus, when in the course of looking at photos, a user comes upon a photo with unidentified faces (or other detectable object), the user just touches the box to active it.

Figure 4C:

Visual feedback of activation can be provided for example by providing a surrounding border or other visual indication as shown in FIG. 4B, and/or audio or other tactile, audible or visual feedback can be provided. Once the icon is activated, audio recording can begin and a record progress bar may be displayed beneath the icon along with a "micon" (microphone icon) to indicate that the image display device IDD is now recording audio to identify the activated object (see FIG. 4C). Such recorded information could be, for example, the name of the person shown in the activated image portion (e.g., "Jerry Alonzo, my brother in law"). Image display device IDD could for example provide a limited recording time for providing relatively succinct identification, and if voice input continued too long, indicate a need to begin again. Once recording is successful (see FIG. 4D), a micon may be displayed in the upper right-hand corner of the image to indicate that an audible tag has successfully been recorded relative to the object.

Thus, a microphone icon (micon) appears next to the box and a bargraph (which fills to show time passing) indicates that the application is now recording a second touch to the box or a preset timeout (e.g., 3 seconds) turns off the microphone and de-activates the box. A small micon appears on the box to indicate that there is a voice tag associated with the detected face/object. Touching the micon plays back the voice tag. Tag boxes, micons and all other tagger interface graphics can be controlled by touching an on-off switch or slider as shown in FIGS. 5A, 5B.

Figure 4D:
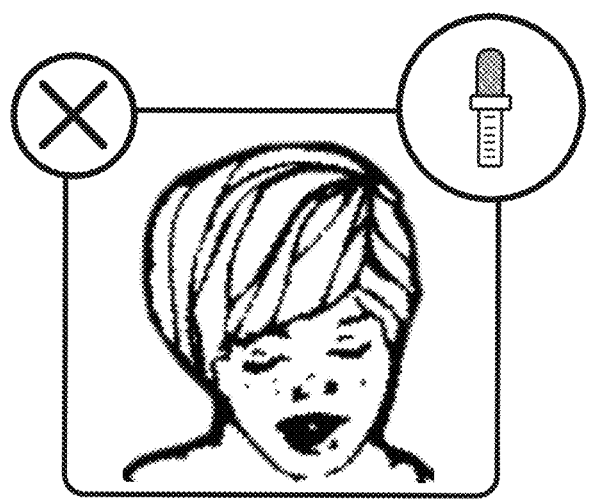
Figure 5:
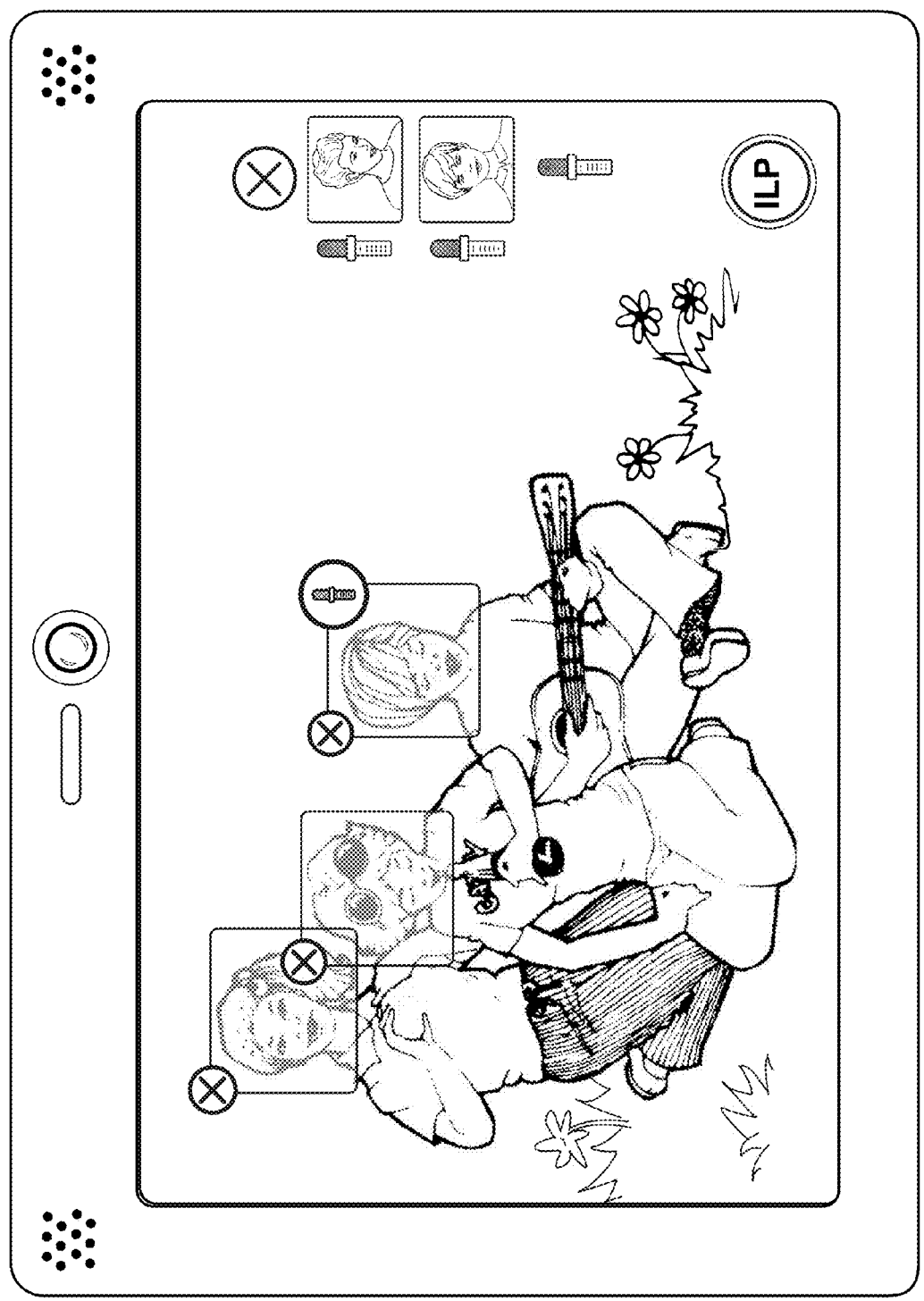
FIG. 5 shows a further example illustrative image display device user interface with additional features.
Figure 5B:
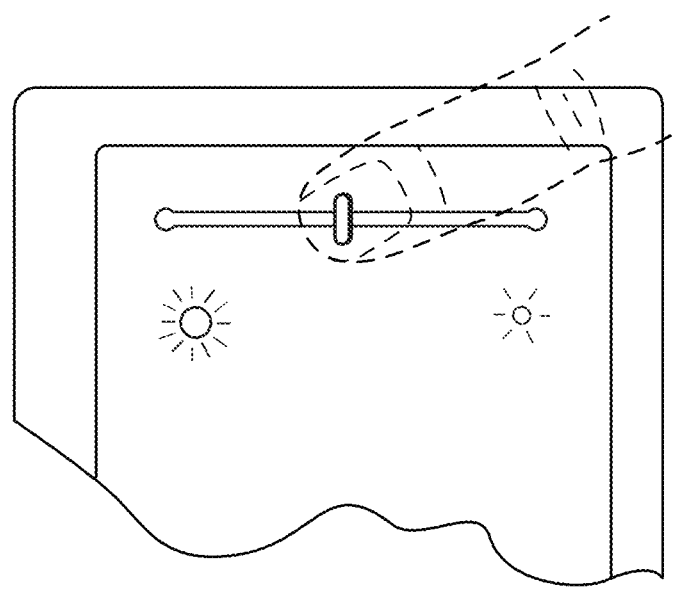
FIGS. 5A and 5B show example user interface feature control.
Figure 5A:
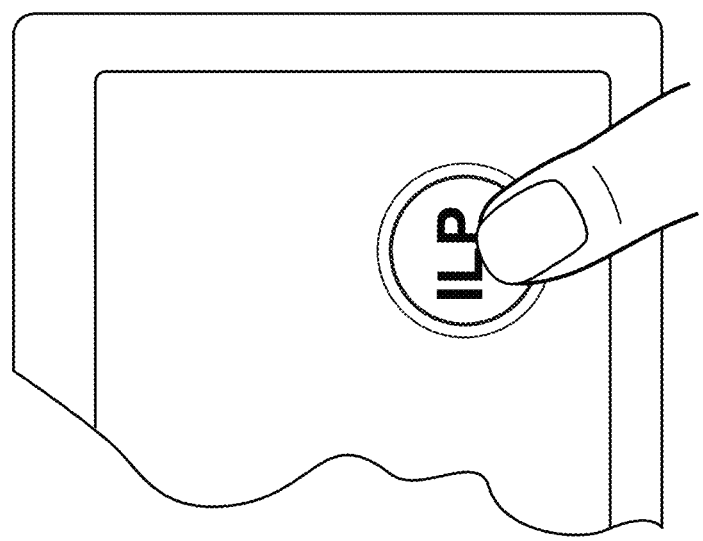

FIG. 5 shows an example state of image display device IDD after an audible tag has been recorded against one object as shown in FIG. 4D, and after the viewers depicted in FIG. 1 have each recorded commentary with respect to the overall image I. Note that the highlighted facial image of the seated boy now has a micon associated with it, indicating that it has been audibly tagged. Additionally, two small image thumbnails on the right-hand side of the displayed image I may show the faces of people who provided, individually or collaboratively, commentary as shown in FIG. 5. The micons next to each of those displayed thumbnails indicate that audio comments have been recorded, and the images themselves may be ones captured by the camera C or by other means when the audible comments were being made. Touching of those icons can cause replay of the audible comments with or without moving video, as desired. Touching the additional micon shown at the bottom may allow the current viewer of the image to add his or her own additional audible commentary and thus her own additional icon to the image.

The tagging described above can be used to associate people with one another for general or specific purposes. For example, looking at the image shown in FIG. 2, the three people shown were together at a particular Fourth of July party. The tagging association created between these three people may for example be used to group those three people together for the purpose of sharing other images and/or communications associated with that same Fourth of July party. Thus, other images created by the same or different sources related to that same party can be shared among the group established by the tagging shown in FIG. 2. This can occur without any explicit "friending" or other action by any of the participants. The mere fact that these three people appeared together in a photo can be sufficient to establish a sharing group for the limited purpose of sharing information concerning that particular event. Or the group so established can be used for more general purposes such as sharing family information, sharing information concerning the summer of 2011, or sharing other categories of social or other information. People outside of this group may or may not be given access to information concerning the information shared among the group. Thus, only the people actually at a party might be permitted to share information concerning the party ("what happens in Vegas stays in Vegas").

By way of illustration, FIGS. 3-1, 3-2 and 3-3 show a woman participating in three different social settings. FIG. 3-1 is a photograph of the woman attending a fundraiser to benefit children in Africa. FIG. 3-2 is a photo of the same woman having dinner with her family. FIG. 3-3 is a photo of the woman working with co-workers. Each of these photos can be tagged and used to establish an association between the woman and the other people in the respective photos. However, the people the woman talked to at the fundraiser are not likely to be interested in information about the woman's workplace, nor is the woman likely to want to share information about her family with either her fundraiser or work acquaintances. In the example implementation, the images of these three social settings can establish different associations and groupings.

The first grouping established by the FIG. 3-1 photo can relate to a fundraiser group—the people who attended the August 2011 fundraiser and are interested in raising funds for children in Africa. The example illustrative system can share information concerning that fundraising event with people who attended the fundraiser as indicated by the FIG. 3-1 photo. Additional photos taken at that same fundraiser can extend the group and/or add additional associations or members to the group. Tagging on such photos can be performed collaboratively by the various members of the group using IDD's that can be disparately located anywhere and communicating between one another and/or one or more servers or other repositories via the Internet or other communications network. Only members of that particular group are permitted to view the images and listen to the voice tags. Thus, in one implementation, the woman's family shown in FIG. 3-2 are not able to access the images unless they also attended the fundraiser, or are given permission to do so.

The second grouping shown in FIG. 3-2 is the woman's immediate family. The family can collaboratively voice tag family photos which are not shared with anyone in the first grouping of FIG. 3-1. Privacy of family details thus remain secure and not exposed to the woman's circle of fundraising acquaintances shown in FIG. 3-1.

The third grouping the FIG. 3-3 image provides of the woman's co-workers is yet another distinct association that can collaborate with respect to voice tagging of work-related photos. People in this group do not have access to the images pertaining to the groupings of FIGS. 3-2 and 3-1 even though the woman is a member of all three groups.

The woman thus can be a member of many distinct groups simultaneously each of which can be maintained separately and securely. The woman does not need to be concerned about exposing her grandmother or her boss to images of a party she and her husband attended. Her grandmother does not need to be bored with information relating to the woman's co-workers, nor do the co-workers have any exposure to the woman's family vacation photos. Meanwhile, collaborative tagging as described above can proceed within each distinct group.

For example, members of a given group once so established can access and share information using a variety of different networked or other devices the members use to access information from many different locations including for example smart phones, iPads, computers, etc. They can collaboratively (e.g., synchronously or asynchronously) construct, augment and edit a photostream surrounding the event. In this context, a photo stream can be an endless series of photos. It can behave sort of like a radio station in one example illustration. It is difficult to predict the next song or the next photo, but it will bring back your favorites on a regular basis. A micon (microphone icon) appears to show that the application is recording. Touching the micon turns off the record mode. The application can do some simple test on the sounds it has recorded to determine if there is any voice recorded. It may eliminate all non-voice recordings. The owner of the photos is notified of the voice comment's existence and he/she can choose to edit and share the comments. A suitable voice to text algorithm can be used to present the owner with text comments to edit or share. The photostream can be renewable in the sense that images can be prioritized, and less important photos can be shown less frequently as they become stale. They can be replayed dynamically in different orders, just as a radio station program, with new photos added to the mix.

Figure 6:
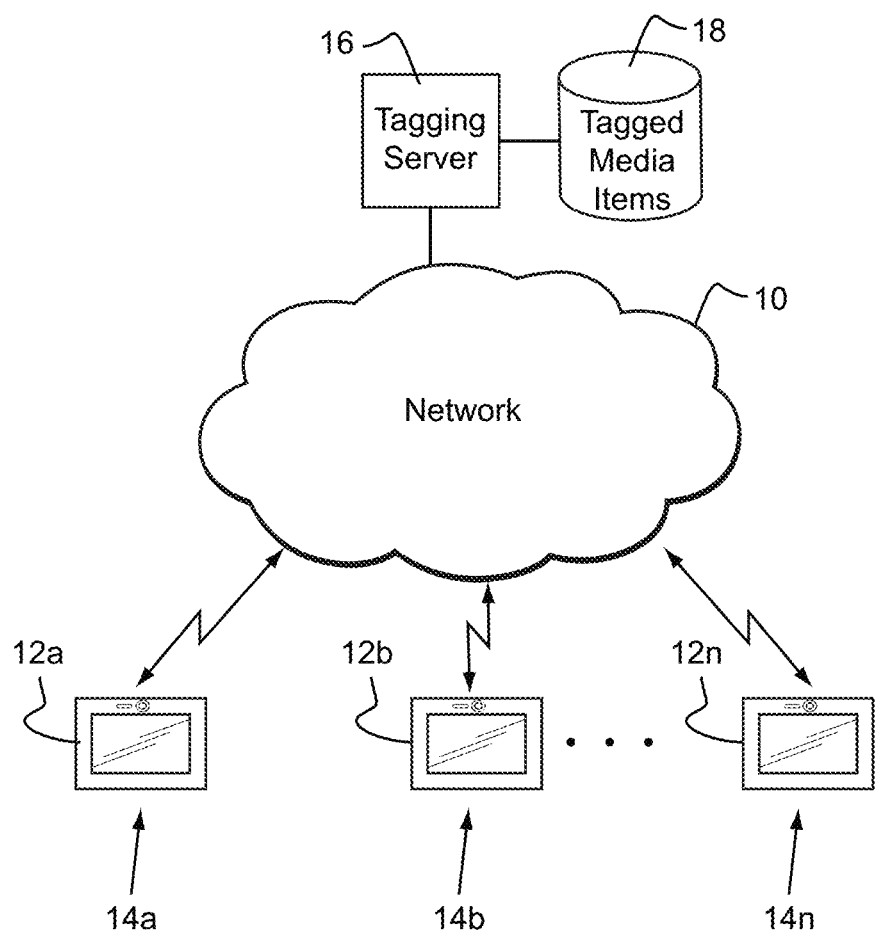
FIG. 6 is a high level schematic diagram of an exemplary illustrative non-limiting networked tagging architecture.
Figure 6A:
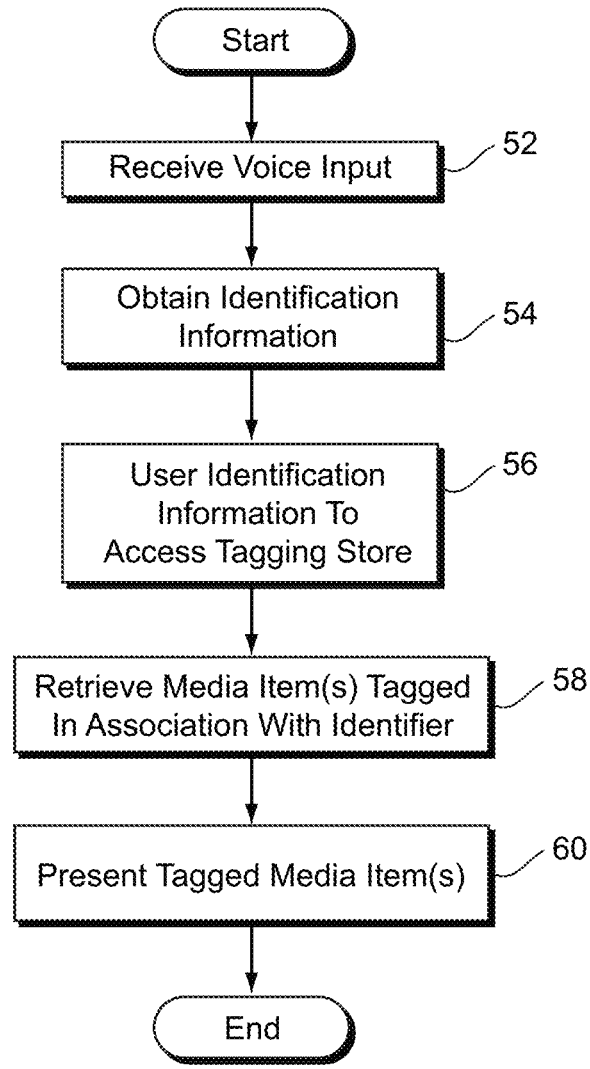
FIG. 6A shows an exemplary illustrative non-limiting process providing linkage between tagged media items and communications for automatic presentation of relevant media in response to initiation or establishment of communications.

FIG. 6 shows an exemplary illustrative non-limiting process for linking tagged media items with communications, and FIG. 6A shows an exemplary illustrative non-limiting architecture for a supporting media item tagging functionality. In the exemplary illustrative non-limiting architecture shown in FIG. 6A, a network such as the Internet 10 provides connectivity with a plurality of IDD or other devices 12 each providing a user interface 14. Devices 12 can comprise any sorts of network-connected computing or other appliance device including but not limited to a cellular telephone, a screen phone, a personal computer, a laptop, a personal digital assistant, an iPad, a digital Wi-Fi enabled photo frame, or any other type of device. Devices 12 are connected to network 10 using conventional wireless or wired connectivity and communicate using conventional known protocols.

In the exemplary illustrative implementation, each device user interface 14 provides a mechanism for interacting with a human user. Such user interface mechanism may typically include a display and input capabilities including one or more input keys. Any type of user interface interactivity mechanisms such as sound, light, tactile or other interface is possible. Devices 12 may include local storage and processing resources or they may use storage and processing resources available on network 10, or both.

In the exemplary illustrative non-limiting implementation, users may use devices 12 to process media items locally, access and share media items over network 10, and communicate with other devices 12 and/or communicate with other network-connected infrastructure. In one particular exemplary implementation, FIG. 6 could represent a cellular telephone, Wi-Fi, Wi-Max or any other real time communications network. In that instance, network 10 would comprise a wireless cellular telephone or other real time network infrastructure, and each of devices 12 would comprise a handheld or portable or handheld type device generally including a display, a series of physical or virtual input keys, a speaker and microphone, and image and audio capture capabilities such as a still and moving picture camera. Users use devices 12 to interact with one another by voice, email, texting, MMS messaging, instant messaging and other. Thus, the user of device 12a can send an electronic message to the user of device 12b, and she may also initiate a voice conversation with the user of device 12n. Multiple devices 12 can be involved in the same communication to provide point-to-point, group and other communications mechanisms. Digital information including but not limited to media items such as digital photographs, digital videos, digital audio files and other information can be shared among devices 12 by transmitting them via network 10.

FIG. 6A further shows tagging functionality including a tagging server 16 connected to a tagging store 18. Tagging store 18 in the exemplary illustrative non-limiting implementation stores a plurality of tagged media items which may comprise or include for example digital photos, videos, audio files, slide shows, or any other type of audio and/or visual presentation. Tagging server 16 is able to access and search tagged media items stored in storage 18. Tagging server 16 and storage 18 may include a number of distributed servers and storage devices some of which may be incorporated within devices 12.

In one exemplary illustrative non-limiting implementation, tagging server 16 permits devices 12 to share tagged media items over network 10. For example, device 12a may interact with tagging server 16 to store tagged items onto tagging store 18 for retrieval by another device 12b. To the extent tagging server 16 and storage 18 is incorporated into each of devices 12 in a distributed fashion, tagged media items can be shared among the devices 12 over network 10 through direct communication between the devices. Alternatively, devices 12 can provide links to each other than permit the devices to retrieve tagged media items from a tagging server(s) 16 and associated tagging store 18 at a centralized or other location. The functionality of tagging server 16 and storage 18 can be distributed within and throughout the infrastructure of network 10 itself.

The architecture shown in FIG. 6A permits sharing and presentation of tagged media items to occur automatically in response to communications initiated or occurring between devices 12. As one example, suppose the user of device 12a initiates a voice conversation with the user of device 12b via network 10. See FIG. 6A block 52. Part of the establishment of voice communications between devices 12a, 12b involves exchanging device and/or user identifications via network 10. See FIG. 6A block 54. In response to such exchanged identifications, devices 12a, 12b and/or the network 10 may automatically access and retrieve associated tagged media items stored on storage 18 via tagging server 16 for presentation to users during the voice call. See FIG. 6A block 56, 58, 60.

As one example, the user of device 12a may have recently stored photographs of her vacation onto the tagging store 18. These media items are tagged with an identification that links them to the user of device 12a. The tagged media items stored on tagging store 18 may also be date coded and may have expiration dates. When the user of device 12a initiates a voice conversation with the user of device 12b, device 12b can use the identification information associated with the device 12a or its user to automatically retrieve media items tagged to the device 12a user. Device 12b may, in one exemplary implementation, in response to receipt of the voice call from device 12a, use received identification information pertaining to device 12a to access the tagged media items of device 12a's user stored on tagging store 18. The user of device 12b may thus automatically be presented with a slide show of the vacation taken by the user of device 12a as the user of device 12a tells the device 12b user about her vacation. Such sharing can occur automatically without any additional user action required other than initiating a voice call. The devices 12 automatically retrieve the tagged media items via server 16 without requiring the user to do anything else in one exemplary implementation.

As a voice or data call initiates or continues, after device 12b presents the vacation slide show or simultaneously with this presentation, device 12a may similarly retrieve tagged media items from tagging store 18 that are associated with the user of device 12b. For example, the user of device 12b may have recently recorded a movie and tagged it with as being associated with that user. Device 12a can retrieve that tagged movie or video from tagging store 18 and present it to the user of device 12a during or after the voice communication. Such automatic presentation of tagged media items in real time (e.g., simultaneously with a voice call or other communication) or on a delayed basis in response to the initiation of communications between devices 12a, 12b can add a new dimension to the conversation between the users. While the user of device 12a is explaining her vacation, the user of device 12b can actually be watching images that the device 12a user collected during her vacation, and/or device 12a can be recording the narrative. Meanwhile, during or after the voice call, tagged media items associated with the user of device 12b can be sent to and displayed on or otherwise presented by device 12a so that the user of device 12a can see what the user of device 12b has been up to lately. Depending upon network 10 bandwidth constraints and connectivity limitations, such presentations and associated data exchanges can be transacted before, during or after real time communications between the users is established.

Even if automatic machine tagging is used, it is typically necessary for a human user to confirm the tagging was correct in order to provide an accurate database for tagging store 18. Therefore, novel techniques for tagging media items for storage on tagging store 18 are also provided in the exemplary illustrative non-limiting implementation. Such exemplary illustrative non-limiting techniques as described below can be used individually or in combination to tag media items for storage on tagging store 18. Part of the appeal of such exemplary illustrative non-limiting user interfaces is that they are fun to use. Tagging interfaces that are fun to will make it more likely that users will spend the time necessary to tag items.

Example—Walk Story

One example use of the technology described above is "Walk Story"—an app for a portable smart phone or other device that records someone talking while they are walking and geotags their voice to locations. Later, another person can go to the same locations and hear the same recordings.

For the Person Recording: In one example non-limiting embodiment, the app is always recording once turned on. It can detect blank spots between voice recordings, but provides x seconds of recording before any voice (as opposed to being voice activated). In one example embodiment, the recording function is always on and the blanks between narration are edited out by the app while saving the entire soundtrack. Each sound recording has a geotag. Geotags can be edited by dragging the tag location to a desired spot and by shrinking or growing the activation radius of each recording on a displayed map.

The Recorder can store any type of media content. Some media content could be audio narration, i.e., the Recorder's voice picked up by a microphone. Other media content could be picture or video information captured by the Record. Still other media content could be historical picture or video information (e.g., actual historical footage of events that took place at that location).

For the Person Playing: The player should activate subjects or people. When a player comes within the activation radius of a geotagged recording, the recording plays. The app keeps track of recordings that have been played before to the particular listener so the player does not have to listen to the same thing twice. It is possible to have plural different recordings of the same spot made by different recorders. Once a recording at a location has played out, another recording at the same spot (or within the activation radius of another nearby spot) is played.

All of this technology can be used on a moving vehicle, so it can be "Drive Story" or "Bike Story" or "Train Story".

Specific Example

Figure 11:
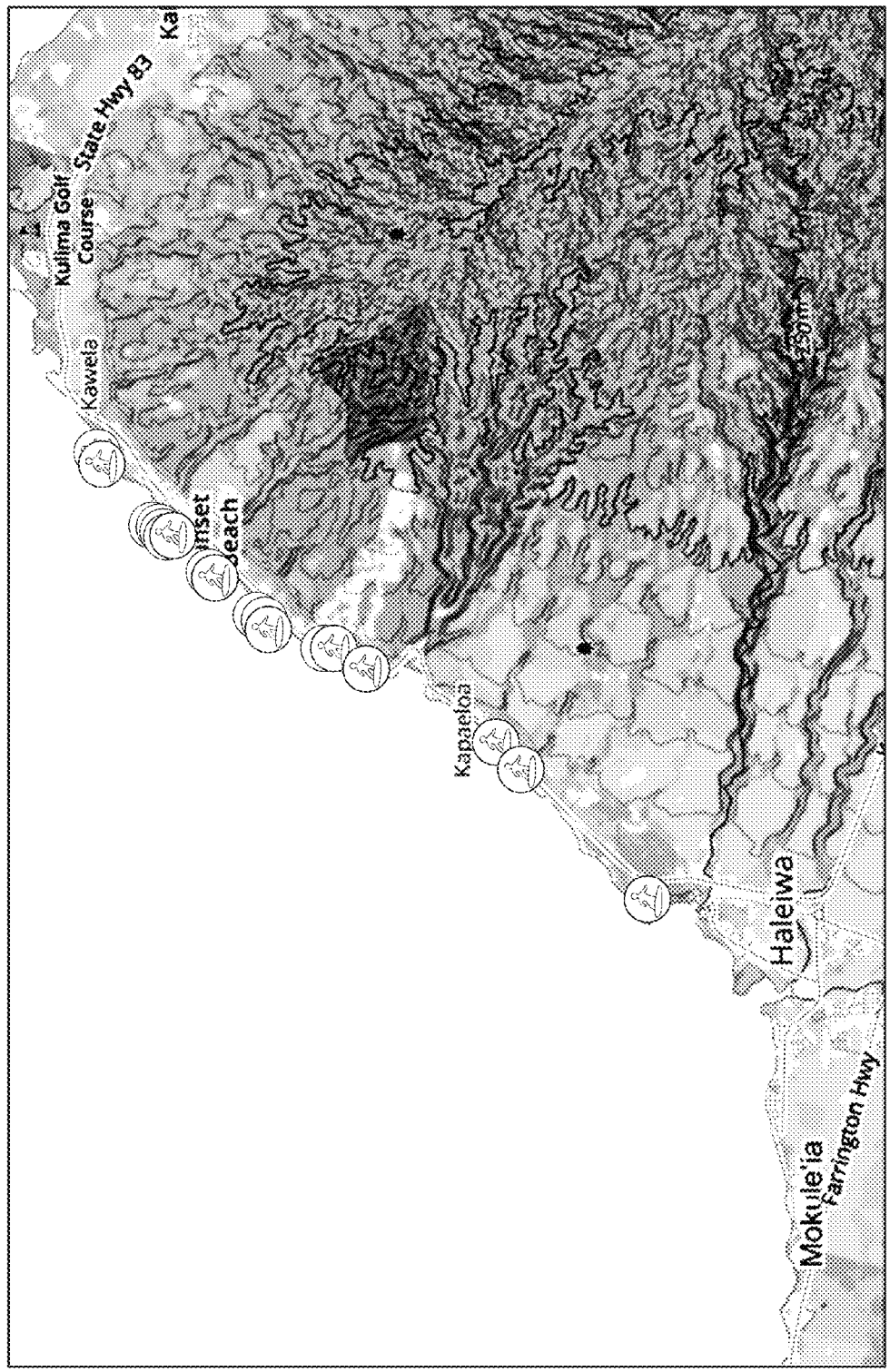
FIG. 11 shows an example non-limiting geotagging scenario.
Figure 12:
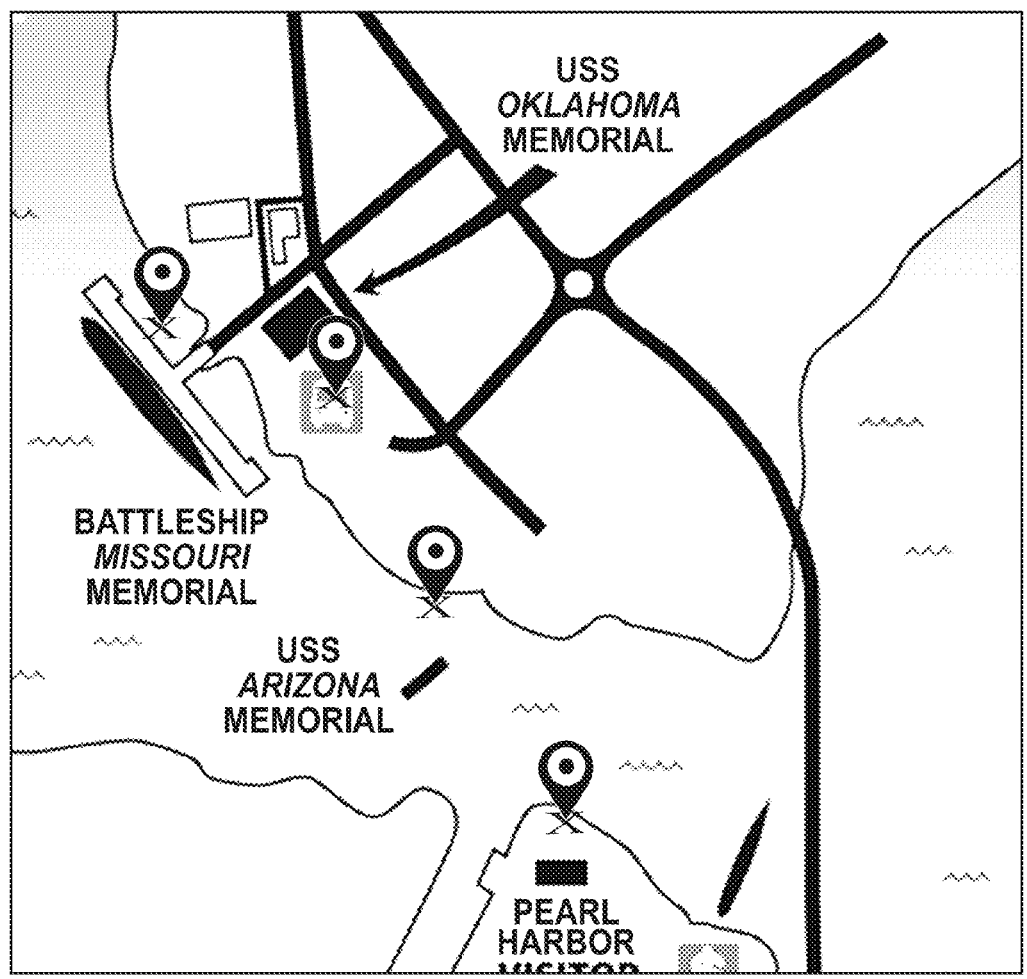
FIG. 12 shows an additional example non-limiting geotagging scenario.

A "Docent" is someone who walks around and talks about the historical aspects of a place such as a museum, a historical site, a surfing beach, a town, a family estate, a cathedral, a park, a battlefield, etc. A "Docent" could be an eye witness. For example, a seaman present during the attack on Pearl Harbor in 1941 could tell the story of what he saw at different locations in Pearl Harbor during the attack (see FIG. 12). Such recording could be supplemented by image and/or video content of actual historical footage of the attack, which could be triggered by the Player's position becoming coincident with the position of the place where the camera was recording or the action that was recorded. As another example, a "Docent" could be a famous surfer who has surfed the North Shore of Oahu. The surfer could describe the surf breaks at each point on the beach (see FIG. 11).

A "Guide" is someone who helps you to navigate around a place especially if it is in nature with no roads. This can be additional information beyond the "content" and provides clues or guides for finding the particular object of interest. The "Guide" information thus can be used to supplement the automatically-provided geolocation information to enable the Player to find the object of interest.

"Orienteering": a game where someone leaves clues in places for people to find. When you get to the next location, you hear the next clue. It's a race to find all the clues. In another non-limiting embodiment, someone could leave a geotagged clue to be found much later by others such as descendants. A grandfather could visit a country in which he was born and use the example non-limiting system to record historical recollections of long-passed people, places and events. His grandchildren must visit the same locations in order to conjure and hear the same recollections.

To enable the example non-limiting technology, the Recorder and the Player each make use of conventional geolocation technology that determines geographic position with sufficient accuracy and precision. It is desirable that when the Player is in the same neighborhood where the Recorder recorded a narration, the Player's device automatically detects such geographic proximity and automatically triggers playback of that narration. The geolocation technology used to trigger when to tell the story is sufficiently accurate to meet Player expectations and provide a user-satisfactory experience. However, "neighborhood" is a relative term that depends on the application. In an art museum for example, geographic precision may need to be within a few meters to ensure that the narration is for the statue the player is currently viewing rather than for the statue just a few meters down the gallery. On the other hand, a tourist on the National Mall or a hiker on the Pacific Crest trail might require an accuracy of only a few tens of meters to distinguish one landmark from another (unless the landmark is hidden). There is also a relationship between mode of transportation and desired precision/accuracy. For example, if the Recorder and Player are each in cars for a Drive Story, geolocation precision/accuracy may need to be only in the range of tens or hundreds of meters. The geolocation error in Drive Story can be much greater than for Walk Story or Bike Story and yet still provide highly satisfactory results.

Figure 7:
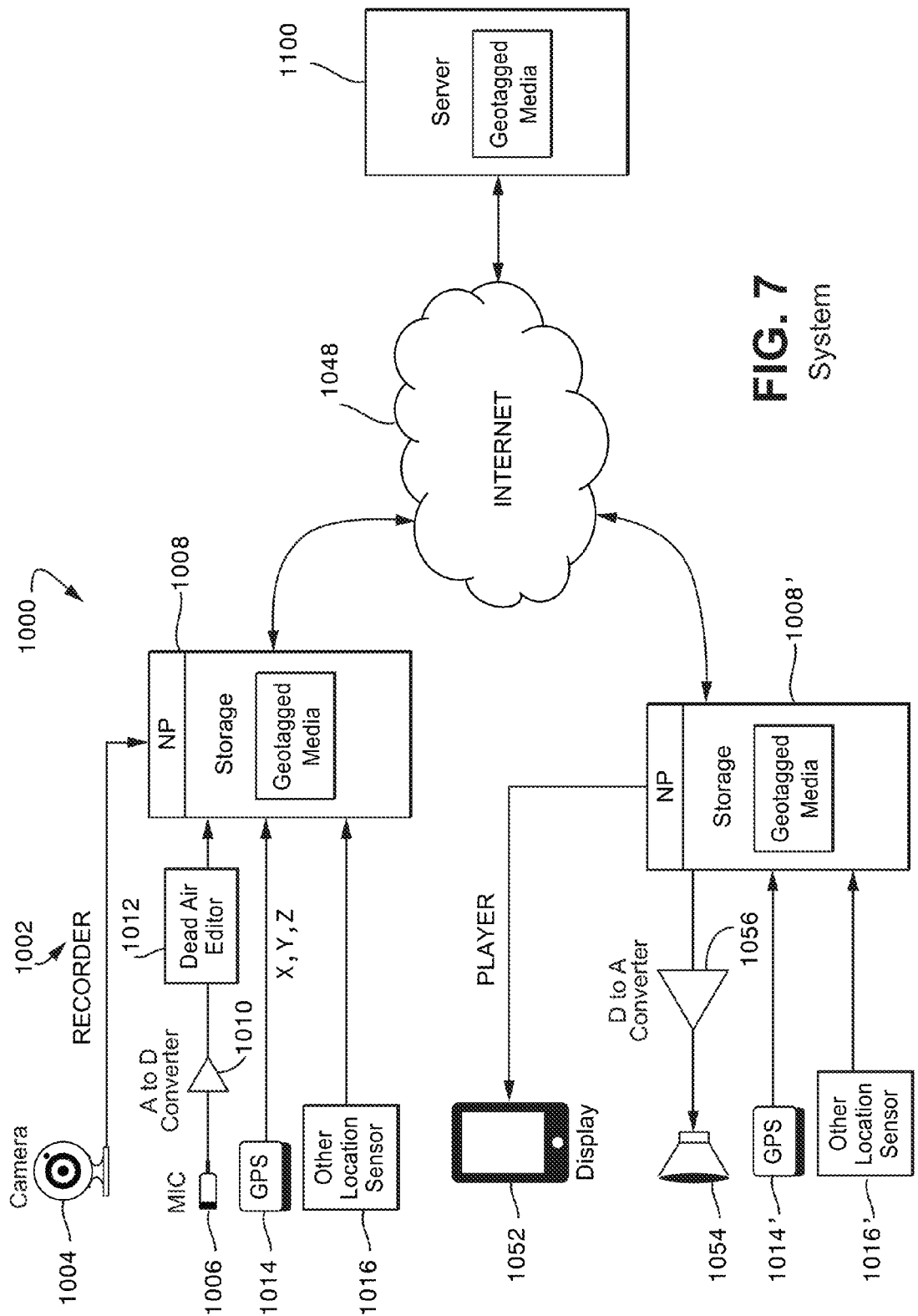
FIG. 7 shows an example non-limiting further system 1000.

FIG. 7 shows an example non-limiting system 1000 that may be used to implement the above scenarios. As can be seen from FIG. 7, system 1000 includes a recorder 1002 and a player 1050. In reality, recorder 1002 and player 1050 can be implemented on the same platform such as a Smartphone running an app having two different modes. Other implementations are also possible using dedicated recorder 1002 and player 1050 devices.

In the example shown, the recorder 1002 includes media input devices such as for example a camera 1004 and a microphone 1006. Once again, camera 1004 and microphone 1006 can be conventional devices built into most Smartphones and tablets or they may be different kinds of cameras and microphones. The output of camera 1004 is provided to a storage 1008 for storage. Storage 1008 can comprise for example an SD card, a built in flash memory or any type of non-transitory, non-volatile memory device under control of at least one processor. Similarly, the output of microphone 1006 may be converted from analog to digital using a conventional A-to-D converter 1010. The output of A-to-D converter 1010 may be edited by a dead air editor 1012 which can be implemented for example by any type of processor, digital signal processor or the like. As described above, the purpose of dead air editor 1012 is to permit microphone 1006 to be constantly "on" and have the recorder 1002 record only meaningful audio narration. A similar dead image editor may be used at the output of camera 1004 in order to prevent storage 1008 from running out of space. In other implementations in which the storage 1008 is essentially unlimited in capacity, the editing could take place by the player 1050 upon playback.

As FIG. 7 further shows, a GPS 1014 and additional location sensor 1016 is employed to determine the location of recorder 1002 at the time that narration and/or images are captured by microphone 1006 and camera 1004, respectively. GPS 1014 may comprise a conventional Global Positioning System receiver that receives signals from multiple geosynchronous satellites to provide a location of the recorder 1002 in three-dimensional (X,Y,Z) space. The other location sensor 1016 may comprise a WiFi or other radio receiver or other sensor used to provide additional location information in order to supplement the output of GPS 1014.

Example locational detection capabilities can be based on any desired technology including but not limited to GPS. Currently, real-world data from the Federal Aviation Administration shows that high-quality GPS SPS receivers provide better than 3.5 meter horizontal accuracy, and that higher accuracy is attainable by using GPS in combination with augmentation systems. Augmentation systems enable real-time positioning to within a few centimeters. Many modern smart phones augment GPS positional measurements with other measurements taken from WiFi access points and the like. However, GPS has limitations in terms of decreased accuracy indoors (no line of sight reception of geosynchronous satellite transmissions) and during overcast weather conditions. Other geolocation technologies such as Apple IBeacon (which uses Bluetooth Low Energy) and Near Field Communications (NFC) or RFID can also be used for geolocation such as in a botanical garden, a museum or other environment in which the Player gets quite close to the located object to view it. In outdoor settings, transmissions of a solar powered IR or other beacon could be used to indicate the location of a spot and an object of interest. Future geolocation technological developments (e.g., based on fusing detected a variety of different RF, magnetic and other signals more effectively using Kalman filtering or the like) will have increased accuracy and precision and thus offer better performance.

Figure 8:
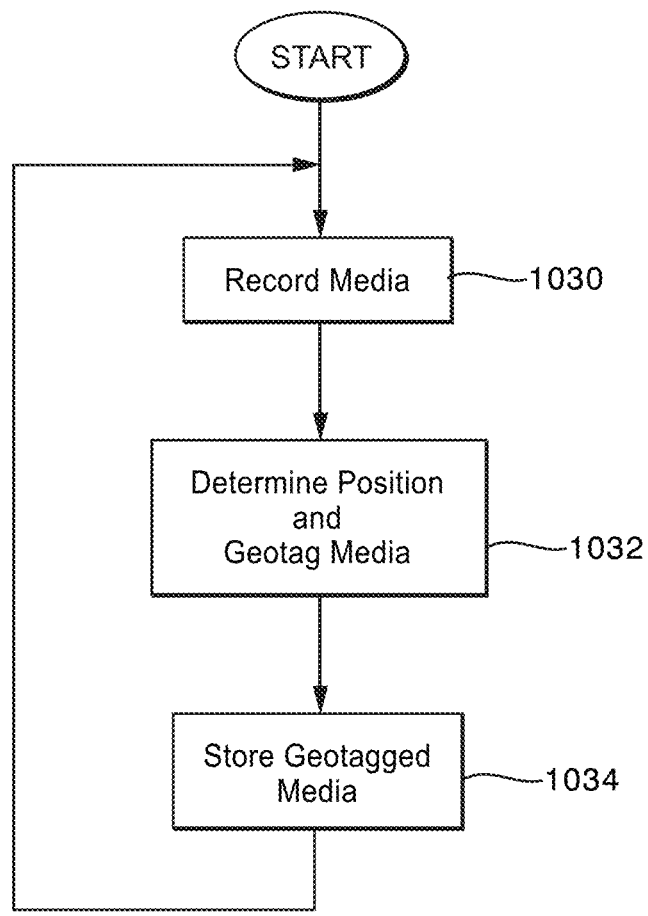
FIG. 8 shows an example non-limiting recorder process.
Figure 10:
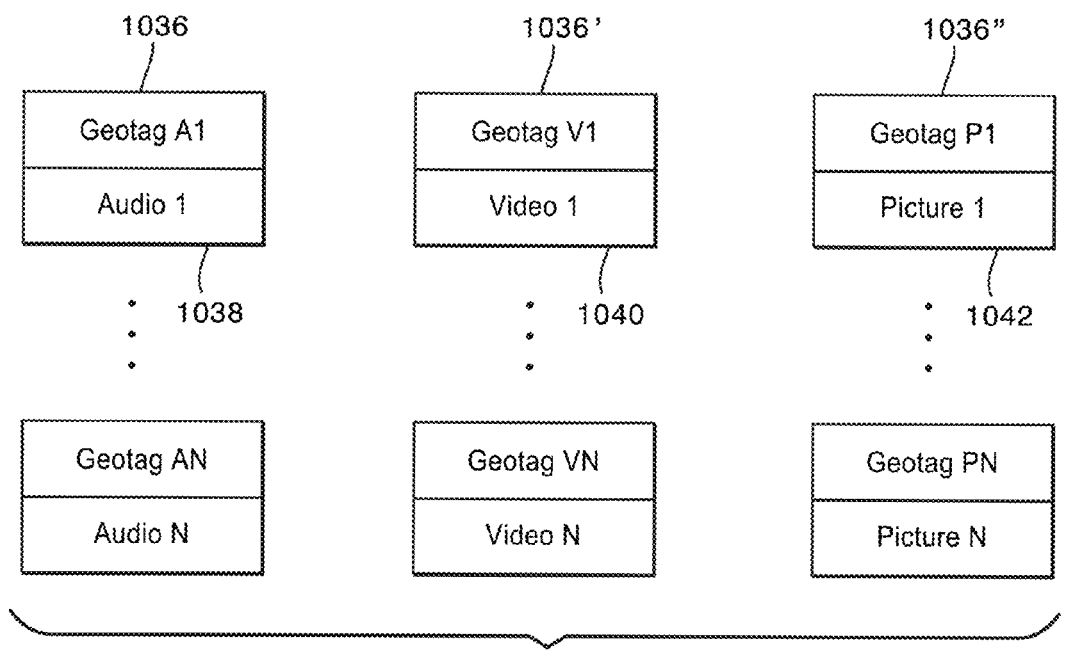
FIG. 10 shows example formats for stored geotagged media.

Referring again to FIGS. 7 and 8, recorder 1002 operates by recording media using camera 1004 and/or microphone 1006 (FIG. 8, block 1030) and determining (using a processor) the corresponding position of the recorder using GPS 1014 and/or other location sensor 1016 (block 1032). The recorder 1002 geotags the recorded media and stores it in storage 1008 (FIG. 8, block 1034). FIG. 10 shows example stored geotagged media which may include audio, video, pictures or any other sort of humanly-perceptible media impressions. As shown in FIG. 10, each geotagged audio media item may include a geotag 1036 (i.e., coordinates of a location on the earth) and the corresponding audio media content 1038. Similarly, each geotagged video item may include a geotag 1036' and a recorded video 1040. Likewise, each geocached image may include a geotag 1036" and a recorded image including but not limited to a photograph 1042.

Referring again to FIG. 7, it is possible in one example non-limiting embodiment for recorder 1002 to provide the output of its storage 1008 via network such as the internet 1048, a local area network, a point to point Bluetooth link, a cable, or any other type of communications mechanism to other devices including player 1050 and/or a server 1100. Thus, in one embodiment, the same device used as recorder 1002 also acts as player 1050 and the storage 1008 of recorder 1002 is the same storage 1008' as that for player 1050. In other example non-limiting scenarios, the recorder 1002 and player 1050 are different devices of the same or different configurations, and the information that recorder 1002 stores in storage 1008 is transferred by any convenient mechanism to storage 1008' of player 1050. In still other example non-limiting implementations, the recorder 1002 uploads stored geotagged media as shown in FIG. 10 via a network 1048 to one or more servers 1100 from which player 1050 may retrieve them from at any time and any place for storage and playback. In one example non-limiting implementation, server 1100 is indexed by geotag so that the player 1050 must present appropriate location coordinates in order to retrieve corresponding geotagged media. In still other implementations, security and authentication may be used to maintain privacy so that only authorized players 1050 can retrieve certain geotagged media information. In other example implementations, the geotagged media server 1100 may be retrieved by anyone, or conditions may be applied for retrieval.

Figure 9:
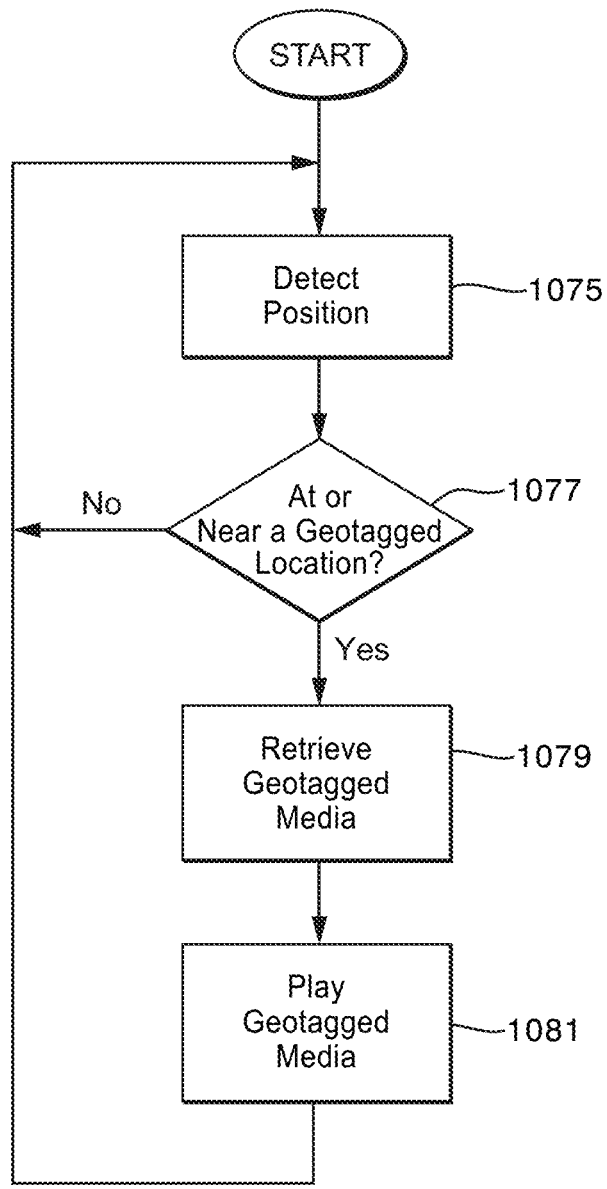
FIG. 9 shows an example non-limiting player process.

As shown in FIG. 7, player 1050 includes various output devices including but not limited to display 1052 and a speaker or earbuds 1054. As shown in FIG. 9, player 1050 uses its own GPS 1014' and other location 1016' to detect the player 1050 geoposition (block 1075 of FIG. 9), and then determines (using at least one processor) whether the player is at or near a geotagged location (FIG. 9, decision block 1077). If the player 1050 detects that it is at or near a location corresponding to a geotagged media item, the player retrieves and plays the geotagged item (FIG. 9, blocks 1079, 1081). In other implementations, player 1050 may provide its position coordinates to server 1100 and the server may perform the operations of FIG. 9, blocks 1077, 1079 to send the player 1050 appropriate geotagged media items corresponding to the player's current location for playback or other presentation.

In one embodiment, the playback system could also sense the direction the Player is viewing the scene. For example, the embodiment could use technology to detect whether the player is viewing the scene from the left or from the right, once the Player is facing in a correct direction, the system could be used to present images of what used to be there. Such historical images could for example show images of now-destroyed or moved structures such as buildings that formerly used to stand at particular locations. As an example, it would be possible to walk through a town that was changed or destroyed by a Tsunami, a battle, depopulation or urban development and see the way it used to look. Such media content could be actual historical photographs, artist recreations or a combination (e.g., what particular locations in a modern European city looked like before the War, back in medieval times, and in Roman times).

While the technology herein has been described in connection with exemplary illustrative implementations, the invention is not to be limited by the disclosure. The invention is intended to be defined by the claims and to cover all corresponding and equivalent arrangements, whether or not specifically disclosed herein.

What is claimed is:

1. In a system comprising at least one recorder device and at least one player device, the at least one recorder device being configured to capture a media item and send the media item with an associated geotag over a network to a server; the at least one player device being configured to play back previously-captured geotagged media items, the server comprising:
    at least one processor connected to non-transitory memory, the at least one processor automatically sending geotagged media items to the at least one player device upon detecting that the at least one player device is currently at a geolocation corresponding to the geolocation at which the at least one recorder device captured the media items, and
    the non-transitory memory being configured to store the geotagged media items received from the at least one recorder device,
    wherein the at least one processor is configured to receive geolocation coordinates from at least one player device other than the recorder device, and conditionally send the geotagged media item to the at least one player device to thereby enable player devices other than the recorder device to conditionally retrieve the geotagged media items based on geolocations of the player devices.

2. The system of claim 1 wherein the at least one recorder device comprises a camera.

3. The system of claim 1 wherein the at least one recorder device comprises a microphone.

4. The system of claim 3 further including a dead air editor that edits the output of the microphone before storing it in non-transitory storage.

5. The system of claim 1 further including at least one Global Positioning System sensor/receiver that is connected to geotagged media items.

6. The system of claim 1 further including a network configured to transfer captured geotag media items from the at least one recorder device to the at least one player device.

7. The system of claim 6 wherein the server at least one processor is further configured to store an archive of stored geotagged media items into the non-transitory memory to be retrieved for presentation by the at least one player device in response to position coordinates.

8. The system of claim 1 wherein the captured media items comprise narration by an eye-witness.

9. The system of claim 1 wherein the captured media items comprise historical archival media.

10. The system of claim 1 wherein the captured media items comprise audio and video.

11. The system of claim 1 wherein the captured media items comprise audio.

12. The system of claim 1 wherein the captured media items comprise video.

13. The system of claim 1 wherein the captured media items comprise images.

14. The system of claim 1 wherein the at least one processor is further configured to determine whether a player device, based on geolocation coordinates the player device provides, is at or near a geolocation associated with a stored media item, and if the at least one processor determines that the player device is at or near said geolocation, the at least one processor is further configured to deliver the stored media item to the player device.

\* \* \* \* \*